(12) United States Patent
Oelke et al.

(10) Patent No.: US 11,092,518 B2
(45) Date of Patent: Aug. 17, 2021

(54) TECHNIQUE FOR MONITORING TECHNICAL EQUIPMENT

(71) Applicant: Siemens Aktiengesellshaft, Munich (DE)

(72) Inventors: Daniela Oelke, Riemerling (DE); Jakob Wimmer, Munich (DE)

(73) Assignee: SIEMENS AKTIENGESELLSCHAFT

(*) Notice: Subject to any disclaimer, the term of this patent is extended or adjusted under 35 U.S.C. 154(b) by 246 days.

(21) Appl. No.: 16/323,799

(22) PCT Filed: Sep. 22, 2016

(86) PCT No.: PCT/EP2016/072552
§ 371 (c)(1),
(2) Date: Feb. 7, 2019

(87) PCT Pub. No.: WO2018/028803
PCT Pub. Date: Feb. 15, 2018

(65) Prior Publication Data
US 2019/0178756 A1    Jun. 13, 2019

(30) Foreign Application Priority Data

Aug. 12, 2016 (EP) ...................................... 16184061

(51) Int. Cl.
*G06F 11/30* (2006.01)
*G01M 99/00* (2011.01)
*G05B 23/02* (2006.01)

(52) U.S. Cl.
CPC ....... *G01M 99/005* (2013.01); *G05B 23/0216* (2013.01)

(58) Field of Classification Search
CPC .................................................. G01M 99/005
See application file for complete search history.

(56) References Cited

U.S. PATENT DOCUMENTS

2007/0239629 A1  10/2007 Ling
2009/0199118 A1   8/2009 Sabato et al.
(Continued)

FOREIGN PATENT DOCUMENTS

CN  103139749 A  6/2013
CN  103220322 A  7/2013
(Continued)

OTHER PUBLICATIONS

PCT International Search Report and Written Opinion of International Searching Authority dated Jul. 2, 2017 corresponding to PCT International Application No. PCT/EP2016/072552 filed Sep. 22, 2016.

*Primary Examiner* — Phuong Huynh
(74) *Attorney, Agent, or Firm* — Schmeiser, Olsen & Watts LLP (57) ABSTRACT

A plurality of event inputs, each corresponding to a unique occurrence of an event within a time period, are received by a processor from one or more event status reporting units is provided. The time period includes an ordered sequence of time slots. The event inputs are grouped into event clusters. Each event cluster corresponds to a unique time slot and includes the event inputs that occurred within the corresponding time slot. The event inputs within a given event cluster are temporally arranged for each of the event clusters. A total count of the event inputs within the given event cluster is determined. Finally, for each of the event clusters, a first representation of the total count and a second representation of the temporal distribution of events along with an indication of the corresponding time slot are displayed simultaneously and distinctly on a display unit.

16 Claims, 4 Drawing Sheets

(56) References Cited

U.S. PATENT DOCUMENTS

| | | | |
|---|---|---|---|
| 2013/0060387 A1 | 3/2013 | Imes et al. | |
| 2013/0103780 A1 | 4/2013 | Panther | |
| 2015/0213631 A1* | 7/2015 | Vander Broek | G06T 11/206 |
| | | | 345/589 |
| 2016/0098647 A1 | 4/2016 | Nixon et al. | |

FOREIGN PATENT DOCUMENTS

| | | |
|---|---|---|
| CN | 203492050 U | 3/2014 |
| CN | 105487501 A | 4/2016 |

* cited by examiner

TECHNIQUE FOR MONITORING TECHNICAL EQUIPMENT

CROSS-REFERENCE TO RELATED APPLICATIONS

This application claims priority to PCT Application No. PCT/EP2016/072552, having a filing date of Sep. 22, 2016, based on European Application No. 16184061.6, having a filing date of Aug. 12, 2016, the entire contents both of which are hereby incorporated by reference.

FIELD OF TECHNOLOGY

The following relates to techniques for monitoring technical equipment, and more particularly to techniques that are applicable for monitoring technical equipment in process plants.

BACKGROUND

Process plants have a variety of technical equipment for example, but not limited to, equipment used in Chemical plants, Petrochemical and refineries, Pulp and Paper Mills, Boiler controls and power plant systems, Power generation plants, Nuclear power plants, Water management systems, Water treatment plants, Sewage treatment plants, Food/Beverage plants, Agro chemical and fertilizer plants, Metal/Metal alloys manufacturing or extraction plants and mines, Metallurgical process plants, Automobile manufacturing plants, Pharmaceutical manufacturing plants, Refining plants such as Sugar refineries, product manufacturing and processing plants such as cement manufacturing plants and so on and so forth. The technical equipment is required to be constantly or periodically monitored for desired function and states for example in a power generation plant using a gas turbine as an equipment a state of the gas turbine—operational or idle or start-up phase etc. needs to be monitored constantly or periodically for optimum production of power from the gas turbine. The equipment is monitored by collecting inputs, or event inputs, such as sensor readings associated with the equipment, inputs provided by local process controllers or controllers at different levels as in distributed control systems to the central control system, and so on and so forth. An example of an event is vibrations reaching a predefined frequency in a gas turbine and an example of corresponding event input may be a frequency of vibrations detected by a suitable sensor associated with the gas turbine. Other examples of event inputs may be, but not limited to, a temperature of a boiler as detected by a temperature sensor, or alarms generated from alarm systems when certain equipment is detected to be in a particular state.

The event inputs, for example the alarms, are presented to an operator and the event inputs informs the operator of the events, some of which may be critical events, occurring during the run of a machine as an example of equipment. Each event input may belong to an event type or event category, for example temperature readings may belong to event category named thermal state of the boiler. Different event categories and associated event inputs in the event categories may have different meanings for example warnings for information on changes of the system state such as change of equipment state, alarms if critical system states are reached, messages regarding operator/controller actions to the equipment, system responses as in equipment responses, messages from operator station/automation station, predictive maintenance request, etc.

It is helpful for an operator/controller if a collection of individual occurrences of an event type, or a certain event category, can be obtained and analyzed for a period of time. A problem thereby is the often overwhelming amount of the event inputs, for example alarms, which makes it difficult for the operator to understand the patterns in the event occurrences, their distributions, and other related aspects with the given type of event occurrences. This relates to events such as same type of alarms, same type warnings, etc. By observing the different aspects over time relating to occurrences of certain events, the equipment can be accordingly fixed, tuned or configured.

This necessitates need for a technique to effectively monitor technical equipment such that event inputs of a certain type are observable over a period of time and along with their related attributes.

SUMMARY

An aspect relates to a technique for monitoring technical equipment that addresses the abovementioned problem.

In a first aspect of the present technique, a method for monitoring technical equipment is presented. The method includes steps of:
  receiving, by a processor, a plurality of event inputs from one or more event status reporting units, wherein each event input corresponds to a unique occurrence of an event within a time period, and wherein the time period includes an ordered sequence of time slots;
  grouping, by the processor, the event inputs into event clusters, wherein each of the event clusters corresponds to a unique time slot from the ordered sequence of time slots and wherein each event cluster includes the event inputs that occurred within the corresponding time slot for the event cluster;
  arranging temporally, by the processor, the event inputs within a given event cluster for each of the event clusters to determine a temporal distribution of events for the given event cluster;
  determining, by the processor, a total count of the event inputs within the given event cluster for each of the event clusters;
  displaying simultaneously and distinctly on a display unit, for each of the event clusters, a first representation of the total count for the event cluster and a second representation of the temporal distribution of events for the event cluster along with an indication of the corresponding time slot for the event cluster. The time slots may be equal in duration.

As a result of the present monitoring technique, for each time slot within the time period, a frequency of the event occurrences, i.e. the event inputs, and a corresponding distribution of the event occurrences, i.e. the event inputs, are determined and displayed simultaneously and distinctly, and thus an operator can compare the frequencies and the corresponding distributions for different time slots.

In an embodiment, the method includes a step of segregating, by the processor, the time period to generate the ordered sequence of time slots.

In another embodiment of the method, the first representation is a bar chart.

In another embodiment of the method, the second representation is one of
  a rug plot,
  a density plot generated by determining a density function using a Kernel Density Estimation for the event inputs within the given event cluster, and a distribution band generated by determining a density function using a Kernel Density Estimation for the event inputs within the given event cluster and wherein different densities or range of densities within the distribution band are represented chromatically.

In another embodiment of the method, at least a first type of the second representation and a second type of the second representation are generated by the processor, the first type of the second representation and the second type of the second representation are distinct from each other and are one of:
- a rug plot,
- a density plot generated by determining a density function using a Kernel Density Estimation for the event inputs within the given event cluster, and
- a distribution band generated by determining a density function using a Kernel Density Estimation for the event inputs within the given event cluster and wherein different densities or ranges of densities within the distribution band are represented chromatically; and
- wherein in displaying the second representation on the display unit, the second representation is configured to be interchanged between the first type and the second type.

In another embodiment of the method, the event inputs are one of sensor readings having predetermined characteristics and manually inputted data.

In another embodiment of the method, the plurality of event inputs from one or more event status reporting units are stored in a storage medium before being received by the processor.

In another embodiment of the method, duration of the time slots is one of selectable by a user and predetermined.

In a second aspect of the present technique, a user interface for monitoring technical equipment is presented. The user interface includes:
- a data interface configured to receive a plurality of event inputs from one or more event status reporting units, wherein each event input corresponds to unique occurrence of an event within a time period, and wherein the time period includes an ordered sequence of time slots;
- a processor programmed to perform:
  - grouping of the event inputs into event clusters, wherein each of the event clusters corresponds to a unique time slot from the ordered sequence of time slots and wherein each event clusters includes the event inputs that occurred within the corresponding time slot for the event cluster,
  - arranging temporally of the event inputs within a given event cluster for each of the event clusters to determine a temporal distribution of events for the given event cluster, and
  - determining of a total count of the event inputs within the given event cluster for each of the event clusters; and
- a display unit configured to display simultaneously and distinctly, for each of the event clusters, a first representation of the total count for the event cluster and a second representation of the temporal distribution of events for the event cluster along with an indication of the corresponding time slot for the event cluster.

In an embodiment of the user interface, the processor is configured to perform segregation of the time period to generate the ordered sequence of time slots.

In another embodiment of the user interface, the processor is further configured to control the display unit to display the first representation as a bar chart.

In another embodiment of the user interface, the processor is further configured to control the display unit to display the second representation as one of:
- a rug plot,
- a density plot generated by determining a density function using a Kernel Density Estimation for the event inputs within the given event cluster, and
- a distribution band generated by determining a density function using a Kernel Density Estimation for the event inputs within the given event cluster and wherein different densities or range of densities within the distribution band are represented chromatically.

In another embodiment of the user interface, the processor is configured to generate at least a first type of the second representation and a second type of the second representation, the first of the second representation and the second type of the second representation are distinct from each other and are one of:
- a rug plot,
- a density plot generated by determining a density function using a Kernel Density Estimation for the event inputs within the given event cluster, and
- a distribution band generated by determining a density function using a Kernel Density Estimation for the event inputs within the given event cluster and wherein different densities or range of densities within the distribution band are represented chromatically; and
- wherein the processor is further configured to control the display unit to interchangeably display the first type of the second representation and the second type of the second representation.

In another embodiment, the user interface includes a storage medium configured to store the plurality of event inputs from one or more event status reporting units, and wherein the processor is configured to receive from the storage medium the plurality of event inputs so stored.

In a third aspect of the present technique, a computer-readable storage media is presented. The computer-readable storage media has stored thereon instructions executable by one or more processors of a computer system, wherein execution of the instructions causes the computer system to perform the method according to the first aspect of the present technique.

In a fourth aspect of the present technique, a computer program product, comprising a computer readable hardware storage device having computer readable program code stored therein, said program code executable by a processor of a computer system to implement a method is presented. The computer program is being executed by one or more processors of a computer system and performs the method according to the first aspect of the present technique.

BRIEF DESCRIPTION

Some of the embodiments will be described in detail, with references to the following Figures, wherein like designations denote like members, wherein.

DETAILED DESCRIPTION

Hereinafter, above-mentioned and other features of the present technique are described in detail. Various embodiments are described with reference to the drawing, wherein like reference numerals are used to refer to like elements throughout. In the following description, for purpose of explanation, numerous specific details are set forth in order to provide a thorough understanding of one or more embodiments. It may be noted that the illustrated embodiments are intended to explain, and not to limit embodiments of the invention. It may be evident that such embodiments may be practiced without these specific details.

The present technique has been described hereinafter in details by referring to FIG. 8 in combination with FIGS. 1 to 7, FIG. 9 and FIG. 10. FIG. 8 schematically represents an exemplary embodiment of a user interface 1 of the present technique that is used for monitoring technical equipment 155 for example, but not limited to, a turbine 155 or a boiler 155. The present technique is applicable to any technical equipment 155 that needs to be monitored, for example, but not limited to, the equipment 155 used in Chemical plants such as boilers, mixing tanks, sedimentation tank, etc, similarly equipment used in Petrochemical and refineries, Pulp and Paper Mills, Boiler controls and power plant systems, Power generation plants, Nuclear power plants, Water management systems, Water treatment plants, Sewage treatment plants, Food/Beverage plants, Agro chemical and fertilizer plants, Metal/Metal alloys manufacturing or extraction plants and mines, Metallurgical process plants, Automobile manufacturing plants, Pharmaceutical manufacturing plants, Refining plants such as Sugar refineries, product manufacturing and processing plants such as cement manufacturing plants and so on and so forth. The technical equipment 155 has been hereinafter also referred to as the equipment 155 or as the turbine 155 for purpose of explanation as an example.

The technical equipment 155 is monitored by different devices such as sensors 150 that have been generally referred to as the event status reporting units 150. The sensors 150 read different aspects of the equipment 155 for example a thermometer 155 reads a temperature of a particular segment of the turbine 150. The sensing of different aspects of the equipment 155 may be continuous, for example sensing temperature continuously from 8 AM in the morning to 8 PM in the evening on a given day, or may be intermittent, for example sensing temperature at one-hour intervals starting at 8 AM in the morning up to 8 PM in the evening on a given day. Different sensors 150 or event status reporting units 150 sense or monitor or read different types of states or events or parameters of the event equipment 150, for example one event status reporting unit 150 reads the temperature while another event status reporting unit 150 senses the vibrations in the turbine 155. Some readings may be more critical or important from perspective of monitoring the equipment 155 than other readings, for example vibrations with frequency higher than a defined cut-off frequency may be more critical than vibrations with frequency lower than the defined cut-off frequency, or for example temperature readings higher than a critical temperature may be more important than temperature readings lower than the critical temperature. The more important readings are indicative of certain events and the sensor data or reading generated by the sensor 150 in response to these events is referred to as the event input 5. Depending on the application, for example power generation or chemical conversion, and/or need of the operator, parameters are fixed that make a reading an event input 5, for example it may be predetermined or programmed that temperature readings above 800 degree centigrade for a section of the turbine 155 is an event input 5 whereas the temperature readings below 800 degree centigrade for the section of the turbine 155 is not an event input 5.

An example of an event may be vibrations reaching a predefined frequency in the turbine 155 and an example of corresponding event input 5 may be a frequency measure or alarm generated by a suitable sensor 150 associated with the gas turbine 150. Other examples of event inputs 5 may be, but not limited to, a temperature of a boiler 155 reaching a critical temperature as detected by a temperature sensor 150, or alarms 5 generated from alarm systems 150 when certain equipment 155 is detected to be in a particular state. Hereinafter the event input 5 has also been referred to as the alarm 5.

Furthermore, there may be different types of event inputs 5, i.e. the event inputs 5 may belong to different categories, for example vibrations with frequency higher than a defined cut-off frequency may be referred to as a category of the event input 5 or the alarm 5, whereas temperature readings higher than cut-off temperature may be referred to as another category of the event input 5 or the alarm 5. For the present technique the event inputs 5 or the alarm 5 of the same category are used i.e. a plurality of the event inputs 5 means two or more event inputs 5 that correspond to two unique occurrences of the same type of event for example vibrational frequency of the turbine 155 reaching or higher than a critical vibrational frequency.

Figure 7:
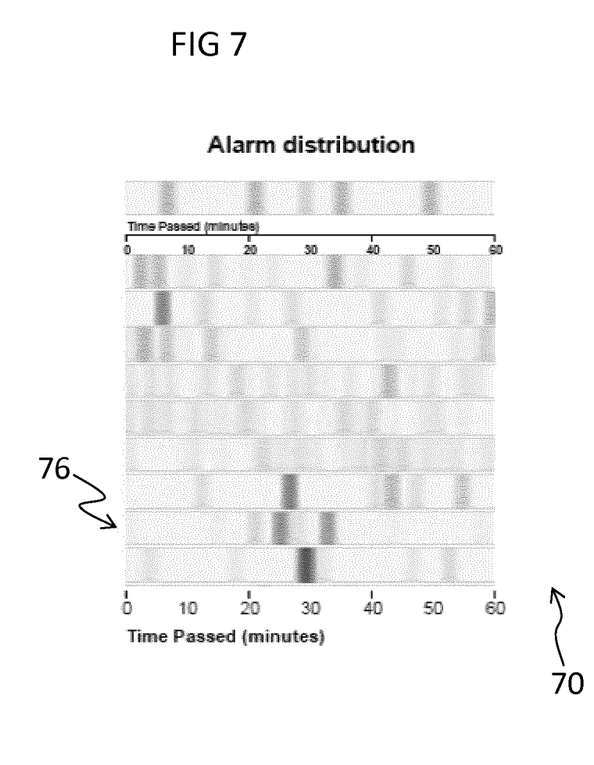
FIG. 7 schematically represents an exemplary embodiment of distribution bands/plots for different time slots that is usable in FIG. 5 and interchangeable with density plots of FIG. 6.
Figure 8:
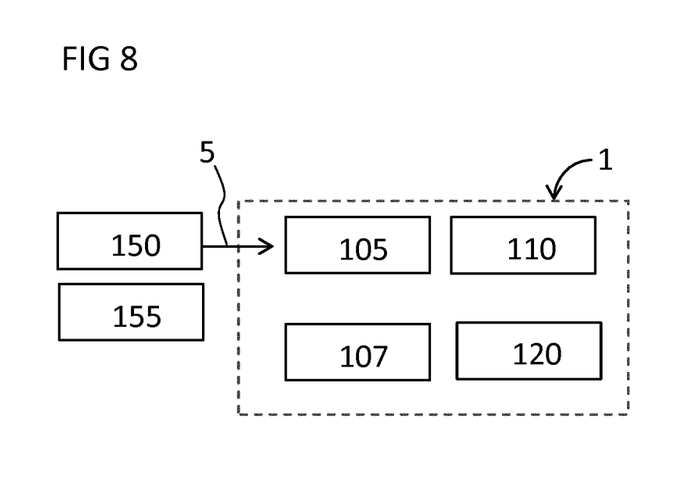
FIG. 8 schematically represents an exemplary embodiment of a user interface of the present technique.
Figure 9:
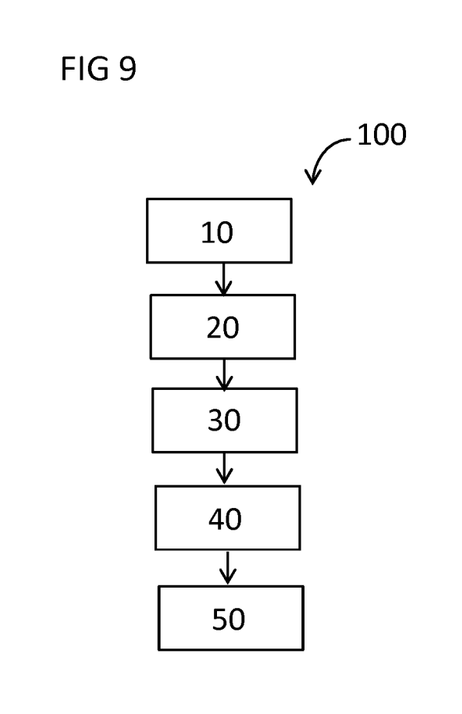
FIG. 9 depicts a flow chart showing an exemplary embodiment of a method of the present technique.
Figure 10:
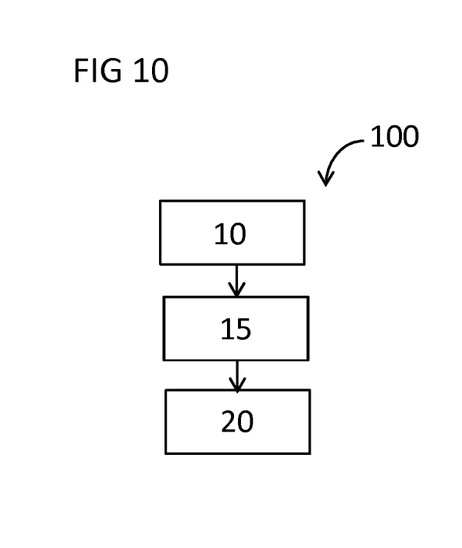
FIG. 10 depicts a flow chart showing another exemplary embodiment of the method of the present technique; in accordance with aspects of the present technique.

The user interface 1 of FIG. 8 is used to implement an exemplary embodiment of a method 100 shown in FIG. 9, and/or the exemplary embodiment of the method 100 shown in FIG. 10 of the present technique. The exemplary embodiments of the method 100 of FIGS. 9 and 10 are explained with reference to FIGS. 1 to 7.

Figure 6:
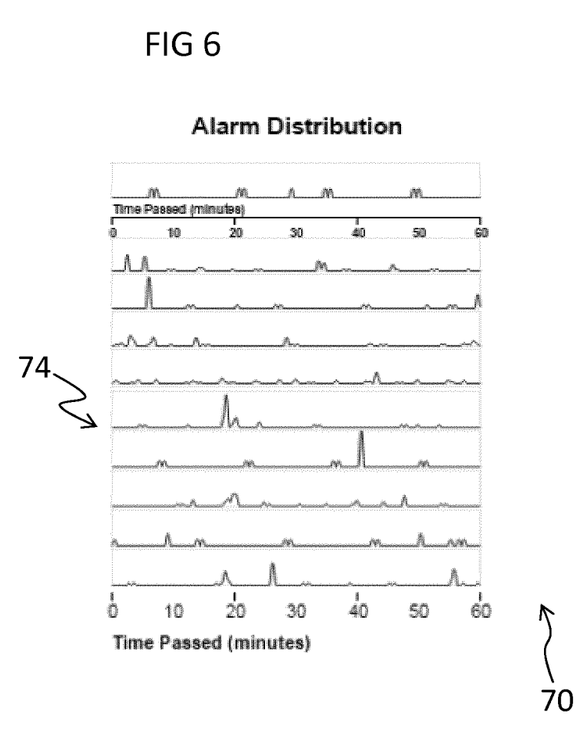
FIG. 6 schematically represents an exemplary embodiment of density plots for different time slots that is usable in FIG. 5.

The user interface 1, hereinafter also referred to as the UI 1, for monitoring technical equipment 155, includes a data interface 105, a processor 110 and a display unit 120. The UI 1 optionally includes a storage medium 107, for example a memory module 107. The data interface 105 receives different event inputs 5, i.e. a plurality of event inputs 5 for example a number of alarms 5 at different time instances. Each event input 5 or the alarm 5 is received from one or more event status reporting units 150 for example sensors 150, as explained hereinabove all the event input 5 in the plurality of the event inputs 5 belongs to the same predefined event category which in turn is one of the predefined event categories. The data interface 105 may be part of the processor 110 or may be a data or signal receiver that is configured to communicate with the processor 110 or may be a part of the storage medium 107 wherein all the received event inputs 5 are stored before being communicated to the processor 110. The event inputs 5 are either generated automatically, for example by sensor reading, or may be an input device that receives inputs manually for example an input fed into a computer or a receiver by a maintenance staff working in the power plant. In FIG. 6, the step 10 is the step of receiving a plurality of event inputs 5 from the one or more event status reporting units 150. Alternatively, or additionally, all or some of the event inputs 5 may be communicated to the processor 110 from the storage medium 107, such as a memory module, that has received and stored event inputs 5 over a given time period.

Figure 5:
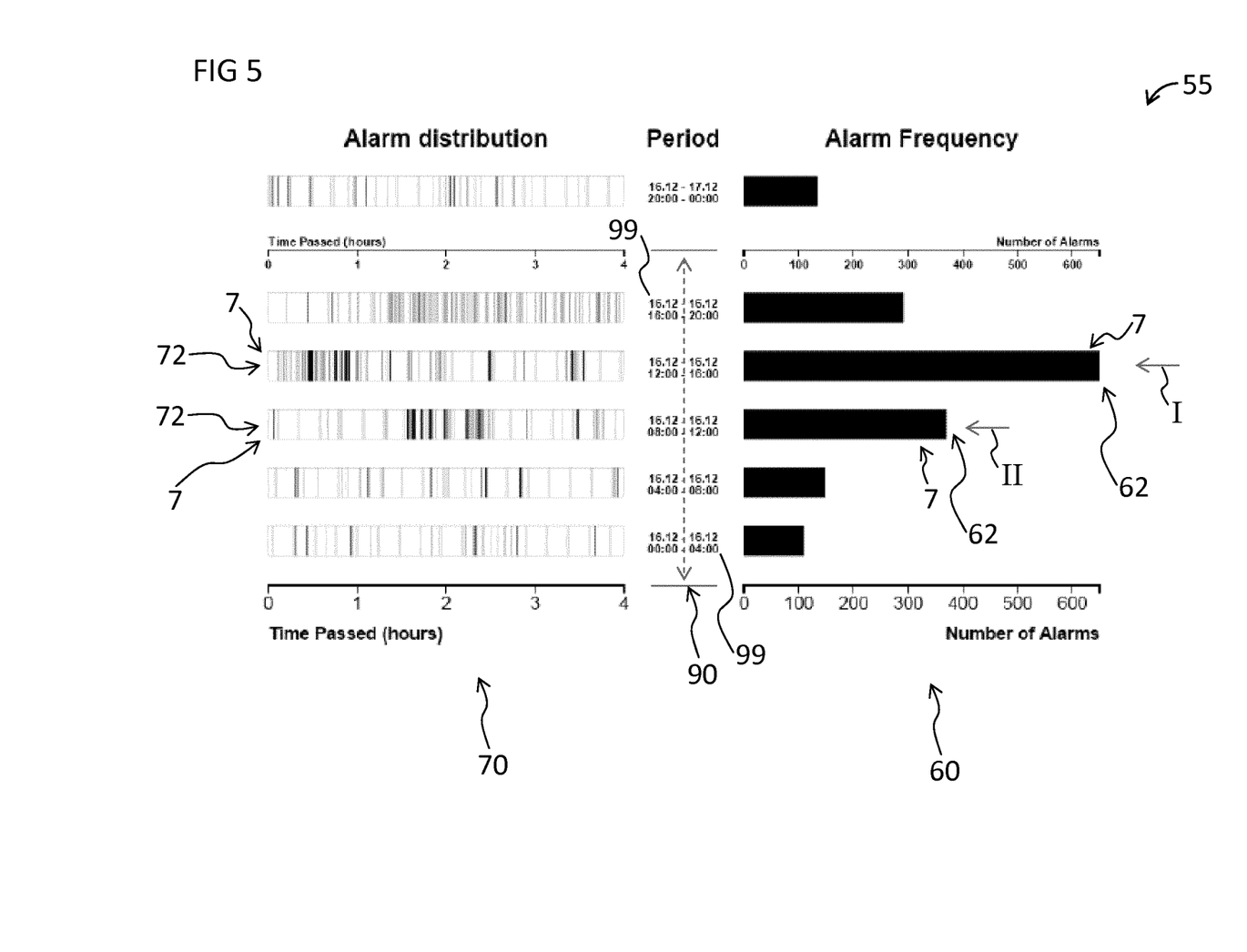
FIG. 5 schematically represents an exemplary embodiment of a scheme of display according to aspects of the present technique.

All the event inputs 5 that are used in the present method 100 for monitoring the equipment 155 are received within a time period 90 (shown in FIG. 5), for example 00:00 hours of a given day e.g. 16.12 i.e. 16 December (as shown in FIG. 5) to 20:00 hours i.e. 8 PM of 16 December. Thus, each event input 5 has a time instance signifying time of occurrence of the event that resulted in generation of the event input 5, or to state simply a time when the event input 5 was received. For example, a first occurrence of an alarm 5 at 00:02 hours, a second occurrence of the alarm 5 at 00:20 hours, a third occurrence of the alarm 5 also at 00:20 hours, a fourth occurrence of the alarm 5 at 003:20 hours, a fifth occurrence of the alarm 5 at 004:40 hours, a sixth occurrence of the alarm 5 at 07:20 hours, and so on and so forth till 20:00 hours. It may be noted that the time period 90 from 00:00 hours to 20:00 hours is only for exemplary purpose. Furthermore, the time period 90 may be spread over two or more days i.e. for example starting at 00:00 on 16 December and ending at 20:00 on 17 December.

The processor 110 in the UI 1 is programmed to perform several steps of the method namely step 20, step 30 and step 40 of the method 100 as shown in FIG. 9. The processor 110 may also optionally perform step 15 of the method 100 as shown in FIG. 10. The step 15 is performed before step 20. The steps 30 and 40 may be performed sequentially in any order i.e. step 30 followed by step 40 or vice versa. The processor 110 may be, but not limited to, a microprocessor, a programmable logic controller, etc.

The time period 90 includes an ordered sequence of time slots 99, as shown in FIG. 5, i.e. the time period 90 is formed of or may be divided into a number of time slots 99. In step 15, the processor 110 segregates or divides the time period 90 into the ordered sequence of time slots 99. As stated hereinabove, the time period 90 represents a time duration within which the event inputs 5 were received. The time slots 99 may be of equal duration, for example the duration of each time slot 99 may be four hours i.e. the time period 90 may be divided into four-hour slots such as from 00:00 hours to 04:00 hours, from 04:00 hours to 08:00 hours, from 08:00 hours to 12:00 hours, from 12:00 hours to 16:00 hours and so on and so forth. The duration of time slots 99 may be preset for the method 100 or may be selected or decided by a user of the method 100, for example the time period 90 of the example of FIG. 5 may be divided into the time slots 99 having duration of two hours each, for example from 00:00 hours to 02:00 hours, from 02:00 hours to 04:00 hours, from 04:00 hours to 06:00 hours, from 06:00 hours to 08:00 hours and so on and so forth.

In the step 20, the event inputs 5 or the alarms 5 are grouped or categorized or clustered into event clusters 7 (shown in FIG. 5) according to the time slot 99 within which said event input 5 was received i.e. in other words according to the time slot 99 in which the event which resulted into the respective event input 5 occurred. Each of the event clusters 7 so generated corresponds to a unique time slot 99 and includes the event inputs 5 that occurred within the corresponding time slot 99. For example, say total of sixty alarms 5 were generated by the sensors 150, or received by the data interface 105 or the processor 110, in the time period 90 for example between 00:00 hours to 20:00 hours then each alarm 5 is categorized according to the time slot 99 in which the event that resulted into the generation or receipt of the alarm 5 occurred, for example say ten alarms 5 were generated by events that occurred between 00:00 hours and 04:00 hours, twelve alarms 5 were generated by events that occurred between 04:00 hours and 08:00 hours, eighteen alarms 5 were generated by events that occurred between 08:00 hours and 12:00 hours, five alarms 5 were generated by events that occurred between 12:00 hours and 16:00 hours, and fifteen alarms 5 were generated by events that occurred between 16:00 hours and 20:00 hours, thereby as a result of step 20, five event clusters were formed and each includes all the alarms 5 that were generated during the time slot 99 corresponding to the respective event cluster 7.

In step 30, for each event cluster 7, the event inputs 5 within that event cluster 7 is temporally arranged, i.e. arranged according to time of occurrence within the particular time slot 99 corresponding to that event cluster 7. As a result of step 30 a temporal distribution of events within each time slot 99 is determined or obtained. For example, say one event cluster 7 corresponding to time slot from 00:00 hours to 04:00 hours, has four alarms 5: a first occurrence of an alarm 5 at 00:02 hours, a second occurrence of the alarm 5 at 00:20 hours, a third occurrence of the alarm 5 also at 00:20 hours, and a fourth occurrence of the alarm 5 at 003:20 hours, then the temporal distribution for that event cluster corresponding to the time slot 99 will have a one occurrence of the alarm 5 at 00:02 hours, two occurrence of the alarm 5 at 00:20 hours, and one occurrence of the alarm 5 at 003:20 hours. Similar temporal distributions are also obtained or determined or arranged for other event clusters 7 that correspond to other time slots 99.

In step 40, a total count of the event inputs 5 within each of the event cluster 7 is determined for each of the event clusters 7. Continuing the above mentioned example of sixty alarms 5, there are five event clusters 7: a first event cluster 7 corresponding the time slot 99 between 00:00 hours and 04:00 hours and has a total count of ten, a second event cluster 7 corresponding the time slot 99 between 04:00 hours and 08:00 hours and has a total count of twelve, a third event cluster 7 corresponding the time slot 99 between 08:00 hours and 12:00 hours and has a total count of eighteen, a fourth event cluster 7 corresponding the time slot 99 between 12:00 hours and 16:00 hours and has a total count of five, and a fifth event cluster 7 corresponding the time slot 99 between 16:00 hours and 20:00 hours and has a total count of fifteen. The total count for a given event cluster 7 is the total number of alarms 5 within the event cluster 7.

Then in a step 50 of the method 100 of FIG. 9, the processor 110 configures or controls or directs the display unit 120 to display or show or portray or present the ordered sequence of time slots 99. Additionally and simultaneously, the processor 110 configures or controls or directs the display unit 120 to display, simultaneously and distinctly, for each of the event clusters 7, a first representation 60 (shown in FIG. 5) showing or indicating or displaying the total count for the event cluster 7, as was determined in step 40, and a second representation 70 (shown in FIG. 5) showing or indicating or displaying the temporal distribution of events for the event cluster 7 along with an indication of the corresponding time slot 99 for the event cluster 7. The second representation 70 has one event cluster per time slot 99. Each of the event clusters 7 have their respective temporal distribution forming the second representation 70 and provides details on how the events are distributed in the event cluster 7 within its corresponding time slot 99.

The term 'simultaneously' as used herein means at the so as to be visible at the same time to an observer observing the display unit 120. The placing of the first and the second representations 60,70 on the display unit 120 may be at the same time or may be sequential but the first and the second representations 60,70 are available for observation at the same time at some instance after being placed on the display unit 120. The term 'distinctly' as used herein means separately displayed on the display unit 120 so as to be observable at the same time to an observer observing the display unit 120, for example by placing side-by-side the first and the second representation 60, 70 within pre-designated regions of a computer screen.

Figure 1:
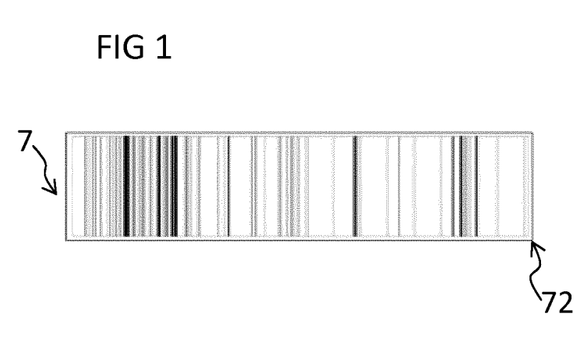
FIG. 1 schematically represents an exemplary embodiment of a rug plot.
Figure 2:
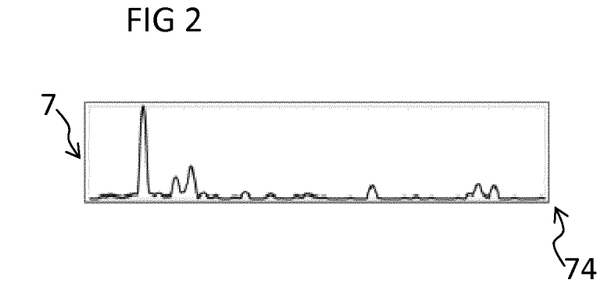
FIG. 2 schematically represents an exemplary embodiment of a density plot.
Figure 3:
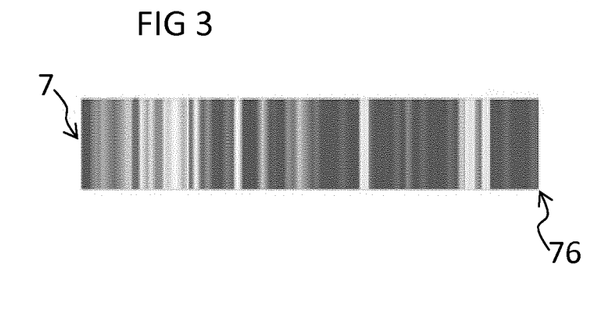
FIG. 3 schematically represents an exemplary embodiment of a distribution band/plot.

An example of such a scheme 55 of display or representation is schematically shown in FIG. 5 and further details and alternates of the scheme 55 of display are shown in FIGS. 1 to 3 and in FIGS. 6 and 7, respectively. FIG. 5 shows five event clusters 7 that are arranged according to their respective corresponding time slots 99 having four-hour interval each, and one reference event cluster 7 on the top indicating a reference time slot which is usually (but not necessarily) the most recent time slot that the other time slots 99 are to be set in relation to in the analysis. The time period 90 is shown by an arrow marked 90 for purpose of explanation and may not be actually displayed in step 50. The five time slots 99 are obtained by segregating the time period 90 starting 00:00 hours on 16.12 and ending at 20:00 hours on 16.12 into equal intervals of four hours each. The first representation 60 shows the total counts for each of the event clusters 7, represented as a bar graph in the example of FIG. 5. The lengths of the bars are mapped to the number of events in the corresponding time slot 99 for a given event cluster 7.

The second representation 70 depicts the temporal distribution represented as a collection of rug plots 72 stacked on top of each other. A rug plot 72 representing one event cluster 7 for an example is shown in FIG. 1. As can be seen in the example of FIG. 5, for each time slot 99, for example a first time slot 99 represented by an arrow marked 'I' and a second time slot 99 represented by an arrow marked 'II', the corresponding event clusters 7 are depicted, and for each event cluster 7 the total count of the event inputs 5 is depicted in the first representation 60 and of the temporal distribution as the rug plot 72 is depicted in the second representation 70, simultaneously and distinctly i.e. for this example side-by-side.

As shown in FIG. 6, in another exemplary embodiment of the method 100, the second representation 70 showing the temporal distribution may be depicted as a collection of density plots 74 stacked on top of each other. A density plot 72 representing one event cluster 7 for an example is shown in FIG. 2. FIG. 6 only depicts the second representation 70 that may be used in FIG. 5 instead of the collection of the rug plots 72 of FIG. 5. The first representation 60 showing the total counts for each of the event clusters 7, represented as the bar graph in the example of FIG. 5 may remain the same and may be displayed simultaneously and distinctly along with the second representation 70 of FIG. 6 i.e. for this example side-by-side.

As shown in FIG. 7, in another exemplary embodiment of the method 100, the second representation 70 showing the temporal distribution may be depicted as a collection of distribution bands 76 stacked on top of each other. A distribution band 76 representing one event cluster 7 for an example is shown in FIG. 3. FIG. 7 only depicts the second representation 70 that may be used in FIG. 5 instead of the collection of the rug plots 72 of FIG. 5. The first representation 60 showing the total counts for each of the event clusters 7, represented as the bar graph in the example of FIG. 5 may remain the same and may be displayed simultaneously and distinctly along with the second representation 70 of FIG. 7 i.e. for this example side-by-side.

The rug plot 72 of FIG. 1 has a long rectangular stripe that could be seen as a 1-dimensional axis. This axis represents a continuous scale, e.g. a temporal dimension of the data (e.g. for displaying event inputs 5). In case of occurrence of an event i.e. for each event input, a tick mark is placed at the position along the scale that represents the specific point in time when the event occurred. The density plot 74 of FIG. 2 may be visualized as a smoothed histogram or smoothed rug plot 72 in which the local density is mapped to the height in the density plot 74. The density plot 74 may be generated by determining a density function using a Kernel Density Estimation, hereinafter KDE, for the event inputs 5 within the given event cluster 7 for which temporal arrangement 30 is being performed. The distribution band 76 may be visualized as being similar in representation as one-dimensional heat map and may also be generated by determining a density function using the KDE for the event inputs 5 within the given event cluster 7. The different densities or range of densities within the distribution band 76 are represented chromatically. One of the parameters of a KDE performed for the density plot 74 or the distribution band 76 is the width of the kernel. The broader the kernel width, the more smoothed is the visualization. Further details of the principle and method of generating rug plots 72, density plots 74 and distribution bands 76 are well known in art of statistics and thus not explained herein in details for sake of brevity.

Figure 4:
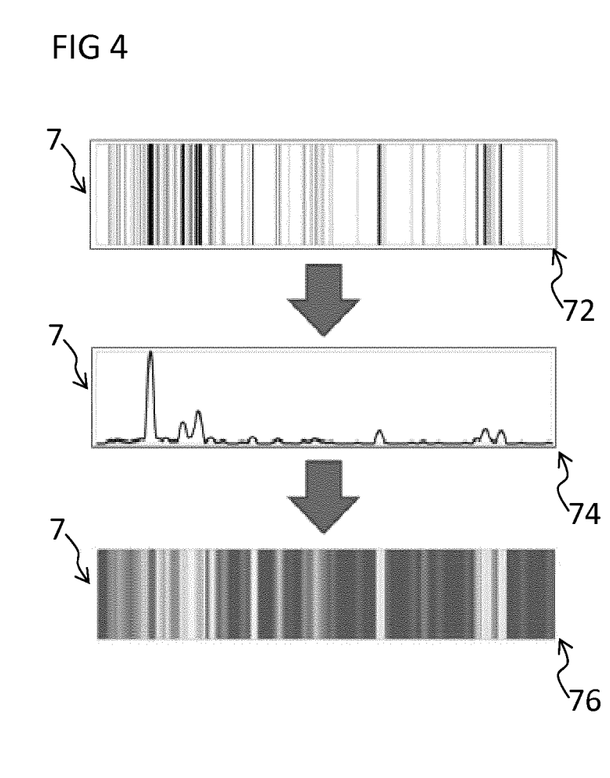
FIG. 4 represents a flow chart schematically representing an exemplary embodiment of steps of obtaining a density plot from a rug plot and a distribution band/plot from a density plot.

FIG. 4 shows the relation between rug plots 72, density plots 74, and distribution band/plot 76 and may be used in the method 100. First, the rug plot 72 is generated. As explained above, a rug plot 72 is a long rectangle. Its extension could be seen as a (in this case temporal) scale. For each event, a tick mark is placed at the position along the scale that represents the specific point in time of occurrence of the event for which an event input 5 was generated. To turn the rug plot 72 into the density plot 74, at the position of each tick mark, a kernel function is overlaid (e.g., a Gaussian kernel). Finally, all kernel functions are summed up at each position to generate the density plot or density curve 74. The type of kernel function and especially its bandwidth determine how much the density distribution is smoothed out in the density plot 74. Next, the density plot/curve 74 is mapped chromatically, i.e. to different colors or shades, to get a 1-dimensional heatmap i.e. the distribution band/plot 76. For each point of the curve (or pixel on the display unit 120) the corresponding height value of the density plot 74 is read out. To each height value a color or distinctive shade is assigned which can be read out of a colormap. This color value is then used to color the corresponding position of the rectangle of a rug plot 72 (without the tick marks being shown).

In another embodiment of the method 100, at least a first type of the second representation 70 and a second type of the second representation 70 are generated by the processor 110. The first type of the second representation 70 may be the collection of the rug plots 72 as shown in FIG. 5, or the collection of the density plots 74 as shown in FIG. 6, or the collection of the distribution bands 76 as shown in FIG. 7. Similarly, the second type of the second representation 70 may be the collection of the rug plots 72 as shown in FIG. 5, or the collection of the density plots 74 as shown in FIG. 6, or the collection of the distribution bands 76 as shown in FIG. 7. However, the first type and the second type of the second representation 70 are distinct from each other i.e. if the first type is the collection of the rug plots 72 as shown in FIG. 5, then the second type is the collection of the density plots 74 as shown in FIG. 6, or the collection of the distribution bands 76 as shown in FIG. 7. Similarly, if the first type is the collection of the density plots 74 as shown in FIG. 6, then the second type is the collection of the rug plots 72 as shown in FIG. 5, or the collection of the distribution bands 76 as shown in FIG. 7. In this embodiment of the method 100, in the step 50, the second representation 70 is configured to be interchanged between the first type and the second type, i.e. for example by an interaction by the user. For example, the user may click on the first type of the second representation 70 displayed on the display unit 120 and then instead of the first type of the second representation 70, the second type of the second representation 70 is displayed on the display unit 120.

Furthermore in another exemplary embodiment of the method 100, further information, e.g. displaying the time instance when a maintenance tasks was performed or when a recipe was changed or when batches have started/terminated, or when there have been operator actions, etc., may be displayed on the display unit such that an observer or user is enabled to visually inspect the further information in relation to the temporal distribution in total but also to the instant in the distribution.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A method for monitoring technical equipment of product manufacturing and processing plants, the method comprising the steps of:
   receiving, by a processor, a plurality of event inputs from one or more sensors or event status reporting units configured to sense or to monitor different types of states or events or parameters of the technical equipment, wherein each event input corresponds to a unique occurrence of an event within a time period, and wherein the time period includes an ordered sequence of time slots;
   grouping, by the processor, the event inputs into event clusters, wherein each of the event clusters corresponds to a unique time slot from the ordered sequence of time slots and wherein each event cluster includes the event inputs that occurred within the corresponding time slot for the event cluster;
   arranging temporally, by the processor, the event inputs within a given event cluster for each of the event clusters to determine a temporal distribution of events for the given event cluster;
   determining, by the processor, a total count of the event inputs within the given event cluster for each of the event clusters;
   displaying simultaneously and distinctly on a display unit, for each of the event clusters, a first representation of the total count for the event cluster and a second representation of the temporal distribution of events for the event cluster along with an indication of the corresponding time slot for the event cluster configured such that the first representation and the corresponding second representation can be compared for different time slots by an operator upon monitoring the technical equipment.

2. The method according to claim 1, comprising a step of dividing, by the processor, the time period to generate the ordered sequence of time slots.

3. The method according to claim 1, wherein the first representation is a bar chart, wherein the lengths of the bars are mapped to the number of events in the corresponding time slot for a given cluster.

4. The method according to claim 1, wherein the second representation is one of
   a rug plot,
   a density plot generated by determining a density function using a Kernel Density Estimation for the event inputs within the given event cluster, and
   a distribution band generated by determining a density function using a Kernel Density Estimation for the event inputs within the given event cluster and wherein different densities or range of densities within the distribution band are represented chromatically.

5. The method according to claim 1, wherein at least a first type of the second representation and a second type of the second representation are generated by the processor, the first type of the second representation and the second type of the second representation are distinct from each other and are one of:
   a rug plot,
   a density plot generated by determining a density function using a Kernel Density Estimation for the event inputs within the given event cluster, and
   a distribution band generated by determining a density function using a Kernel Density Estimation for the event inputs within the given event cluster and wherein different densities or ranges of densities within the distribution band are represented chromatically; and
   wherein in displaying the second representation on the display unit, the second representation is configured to be interchanged between the first type and the second type.

6. The method according to claim 1, wherein the event inputs are one of sensor readings having predetermined characteristics and manually inputted data.

7. The method according to claim 1, wherein the plurality of event inputs from one or more event status reporting units are stored in a storage medium before being received by the processor.

8. The method according to claim 1, wherein duration of the time slots is one of selectable by a user and predetermined.

9. A user interface for monitoring technical equipment of product manufacturing and processing plants, the user interface comprising:
   a data interface configured to receive a plurality of event inputs from one or more sensors or event status reporting units configured to sense or to monitor different types of states or events or parameters of the technical equipment, wherein each event input corresponds to unique occurrence of an event within a time period, and wherein the time period includes an ordered sequence of time slots;

a processor programmed to perform:

grouping of the event inputs into event clusters, wherein each of the event clusters corresponds to a unique time slot from the ordered sequence of time slots and wherein each event clusters includes the event inputs that occurred within the corresponding time slot for the event cluster arranging temporally of the event inputs within a given event cluster for each of the event clusters to determine a temporal distribution of events for the given event cluster, and determining of a total count of the event inputs within the given event cluster for each of the event clusters; and a display unit configured to display simultaneously and distinctly, for each of the event clusters, a first representation of the total count for the event cluster and a second representation of the temporal distribution of events for the event cluster along with an indication of the corresponding time slot for the event cluster such that the first representation and the corresponding second representation can be compared for different time slots by a user upon monitoring the technical equipment.

10. The user interface according to claim 9, wherein the processor is configured to perform dividing of the time period to generate the ordered sequence of time slots.

11. The user interface according to claim 9, wherein the processor is further configured to control the display unit to display the first representation as a bar chart, wherein the lengths of the bars are mapped to the number of events in the corresponding time slot for a given cluster.

12. The user interface according to claim 9, wherein the processor is further configured to control the display unit to display the second representation as one of:
  a rug plot,
  a density plot generated by determining a density function using a Kernel Density Estimation for the event inputs within the given event cluster, and
  a distribution band generated by determining a density function using a Kernel Density Estimation for the event inputs within the given event cluster and wherein different densities or range of densities within the distribution band are represented chromatically.

13. The user interface according to claim 9, wherein the processor is configured to generate at least a first type of the second representation and a second type of the second representation, the first type of the second representation and the second type of the second representation are distinct from each other and are one of:
  a rug plot,
  a density plot generated by determining a density function using a Kernel Density Estimation for the event inputs within the given event cluster, and
  a distribution band generated by determining a density function using a Kernel Density Estimation for the event inputs within the given event cluster and wherein different densities or range of densities within the distribution band are represented chromatically; and
wherein the processor is further configured to control the display unit to interchangeably display the first type of the second representation and the second type of the second representation.

14. The user interface according to claim 9, comprising a storage medium configured to store the plurality of event inputs from one or more event status reporting units, and wherein the processor is configured to receive from the storage medium the plurality of event inputs so stored.

15. A computer-readable storage media having stored thereon:
  instructions executable by one or more processors of a computer system, wherein execution of the instructions causes the computer system to perform the method according to claim 1.

16. A computer program product, comprising a computer readable hardware storage device having computer readable program code stored therein, said program code executable by a processor of a computer system to implement the method according to claim 1.

* * * * *